Sept. 20, 1955      E. W. WRIGHT      2,718,156
BELT ALIGNING MECHANISM
Filed June 12, 1951      2 Sheets-Sheet 1
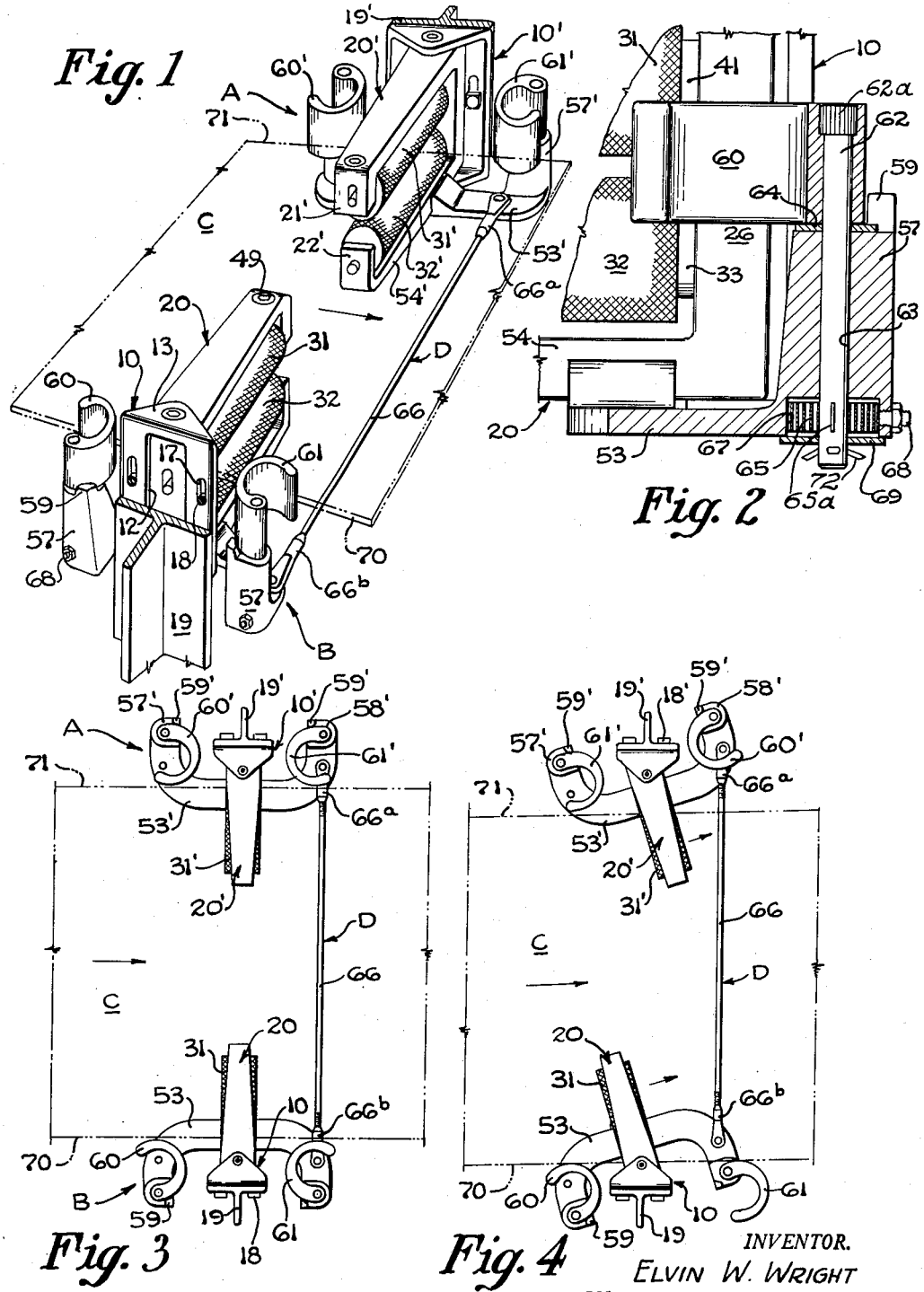
INVENTOR.
ELVIN W. WRIGHT
BY
Leslie M. Hansen
HIS ATTORNEY.

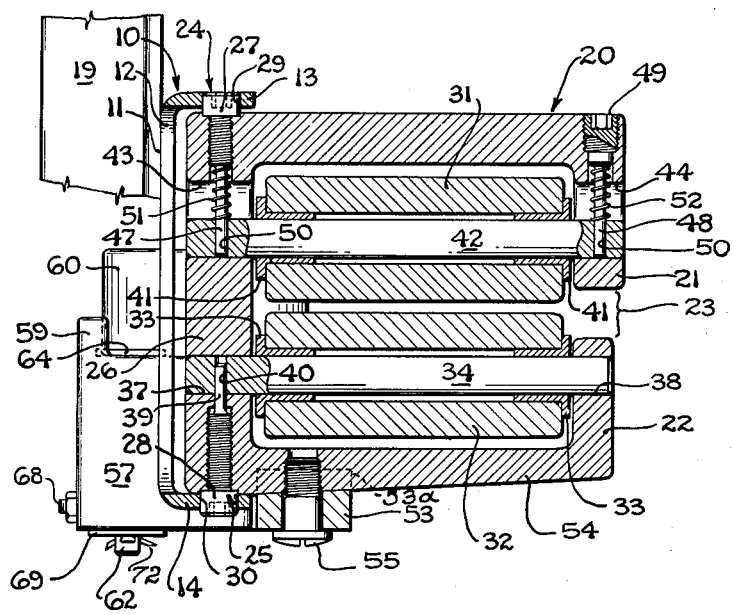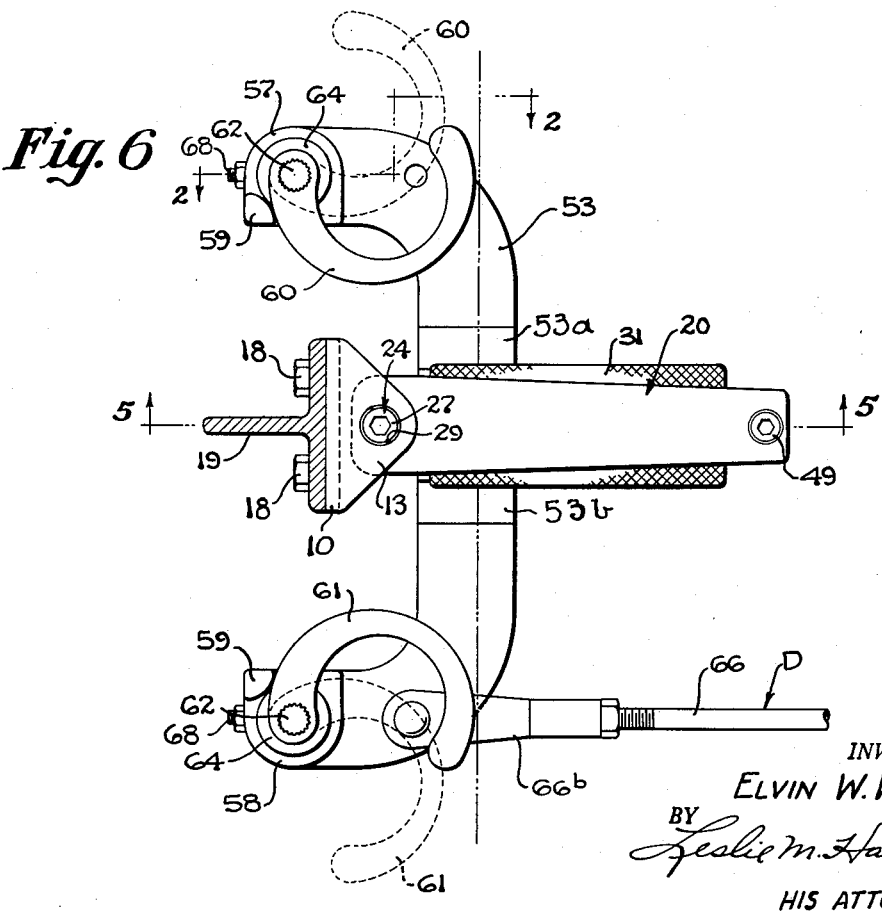

United States Patent Office 2,718,156
Patented Sept. 20, 1955

2,718,156

BELT ALIGNING MECHANISM

Elvin W. Wright, Redwood City, Calif., assignor of one-half to Charles E. Nye, Redwood City, Calif.

Application June 12, 1951, Serial No. 231,204

7 Claims. (Cl. 74—241)

The present invention relates to belt aligners and pertains more particularly to mechanism for maintaining in alignment large heavy belts, such as conveyor belts.

A major cause of excess wear and unsatisfactory performance in large flat belts such as conveyor belts is their tendency to "wander" away from a position of centralized alignment with their supporting pulleys or rollers. Such wandering of the belt may be the result of any one of a number of causes, such as for example, lack of proper alignment of the pulleys or rollers around which the belt is trained, axial tilting of one or more of the pulleys or rollers, or uneven loading of the belt. It is an object of the present invention, therefore, to improve the performance of a conveyor belt by maintaining it in a predetermined condition of alignment with the pulleys or rollers around which it is trained.

Another object of the invention is to provide means operated by the belt when in misaligned condition to return the belt to a predetermined condition of alignment.

The invention has for a still further object the provision of means for guiding a belt to a predetermined centered condition when displaced therefrom, said means being adapted to operate without re-adjustment upon reversal of the direction of belt run.

In general, the invention contemplates gripping portions of a conveyor belt by free running rollers mounted in swiveled frames which are adapted when the roller axes are disposed at right angles to the longitudinal center line of the belt, to maintain the belt against lateral displacement. The swiveled frames further are adapted to be moved pivotally to a predetermined position of adjustment by the displacement of edge feeler means carried by the swiveled frames when the belt wanders from a predetermined centered condition. Such pivotal movement of the swiveled roller frames steers the rollers mounted therein to position their axes at an acute angle to the longitudinal center line of the belt, thereby to urge the belt back toward its predetermined centered condition.

The foregoing and other objects and advantages of the invention will be apparent from the following description and the accompanying drawings, wherein:

Fig. 1 is a perspective view of a belt aligning mechanism embodying the present invention, a fragment of the belt to be aligned being shown in broken lines.

Fig. 2 is an enlarged fragmentary section taken along line 2—2 of Fig. 6, portions thereof being broken away.

Fig. 3 is a diagrammatic plan view of the device as it appears with the belt, shown in broken lines, properly centered therein.

Fig. 4 is a diagrammatic view similar to Fig. 3, but with the belt moved laterally from its properly centered position.

Fig. 5 is an enlarged sectional view taken in the plane of the roll axes of a straightening unit for one side of the belt, a portion of a mounting post being shown.

Fig. 6 is a plan view of the unit shown in Fig. 5, the belt feeling fingers being shown in displaced position in broken lines, and the edge of the belt being indicated in a broken line.

In the illustrated embodiment of the invention, a belt aligning mechanism comprises a pair of similar units A and B (Figs. 1, 3 and 4) having belt controlling portions thereof mounted for pivotal movement on opposite sides of a conveyor belt C, the alignment of which the device is intended to control. The pivotally mounted portions of the two units A and B are connected together by a link D, which is adjusted to a length which will align the two units at right angles to the center line of the belt C when the belt is in predetermined centered position therebetween, and will cause the pivoted portions of the two units to swing in unison when one or the other is angularly displaced from its normal position by a wandering of the belt from its centered condition. Since the two units A and B are similar to each other, only the unit A will be described in detail. In order to distinguish between corresponding parts of the two units, those pertaining to unit A will bear unprimed numerals while the corresponding parts of unit B will be designated by the primes of the same numbers.

The unit A comprises a mounting bracket 10 which may be of cast metal. The bracket 10 comprises a flat plate portion 11 with a central rectangular opening 12 extending throughout its length for a purpose which will become apparent later herein. The bracket 10 has generally triangular upper and lower end portions 13 and 14 respectively formed integrally therewith to extend at right angles to the flat plate portion 11. A pair of slotted holes 17, 17 (Fig. 1) are provided one at each side of the central opening 12 of the plate portion 11 to receive bolts 18, 18 by which the bracket 10, and thereby the unit A, is secured to a suitable supporting member such as a T-bar 19 which may be secured to the conveyor frame, not shown, or other convenient rigid support. Pivotally mounted in the bracket 10 is a generally U-shaped roller support frame 20 mounted with its legs disposed perpendicularly to the plane of the plate portion. The free ends 21 and 22 of the legs are bent toward each other and are spaced apart by a gap 23 of a size to clear the belt C when it is inserted therein.

The pivotal mounting arrangement for the U-frame 20 (Fig. 5) comprises a pair of socket-head screws 24 and 25 screwed into threaded, axially aligned holes in the top and bottom, respectively, of the closed end 26 of the U-frame 20. The externally cylindrical head portions 27 and 28 of these bolts are pivoted, respectively, in holes 29 and 30 provided therefor in the triangular end portions of the bracket 10. The rectangular opening 12 in the bracket plate portion 11 provides clearance to permit free swinging movement, within desired limits, of the U-frame 20 about its pivot screws 24 and 25.

A pair of belt gripping and guiding rollers 31 and 32 are mounted in normally axially parallel relation in the U-frame 20. These rollers have their peripheries adapted to have frictional engagement with the type of belt which they are designed to control. For rubber, fabric or leather belts, for example, the rollers may be of metal, knurled as indicated in Figs. 1, 2 and 6.

As illustrated in Fig. 5, the lower roller 32 is mounted to rotate in a pair of bearing bushings 33, 33. The bushings 33, 33 are mounted on a shaft 34 which is inserted in aligned holes 37 and 38 in the closed end portion 26, and the inturned lower leg portions 22, respectively, of the U-frame 20. The shaft 34 is secured against displacement by a pin portion 39 formed integrally with the socket head screw 25 and inserted in a hole 40 provided therefor in the shaft 34.

The upper roller 31 is rotatably mounted similarly to the lower roller 32, in bearing bushings 41, 41 mounted on a shaft 42 inserted in slotted holes 43 and 44 in the closed end portion 26, and the inturned upper leg portion 21, respectively of the U-frame 20. The upper roller shaft 42 is retained against axial displacement, but free for vertical sliding movement within the slotted holes 43 and 44 by a pair of pin portions 47 and 48 formed to extend endwise from the upper socket head screw 24 and from a screw 49, respectively. The screw 49 is screwed into a threaded hole in the upper inturned leg portion 21. The pin portions 47 and 48 are inserted for free slidable movement in holes 50, 50 provided therefor in the upper roller shaft 42. A pair of coil springs 51 and 52 are mounted on the pins 47 and 48, respectively, and are held in compression between the body portions of their respective screws 24 and 49 and the upper roller shaft 42. The biasing force of the springs 51 and 52 urges the rollers 31 and 32 toward each other, resiliently to grip the belt C when inserted therebetween.

For pivotally moving the frame A, and thereby the rollers 31 and 32 to desired positions of adjustment, a C-shaped feeler bracket 53, which may be of cast metal, is provided with a pair of lugs 53a and 53b adapted to receive the lower leg 54 of the U-frame 20 closely therebetween. A screw 55 (Figs. 2 and 5) secures the feeler bracket 53 rigidly to the U-frame 20. A pair of similar but reversed upright abutments 57 and 58 are provided, one on each end of the C-shaped feeler support bracket 53, and a stop lug 59 is formed integrally with each abutment to serve as a limit stop for the inward swinging movement of a pair of similar but reversed, curved feeler fingers 60 and 61 pivotally mounted one on each abutment.

The feeler fingers 60 and 61 are adapted to be engaged by the edge of the belt C when it wanders from a predetermined centered position between the units A and B to swing the roller support U-frames 20 from their normal positions shown in Fig. 3 toward a belt restoring position shown in Fig. 4, for returning the belt C to its centered position in a manner to be described later herein. Since the fingers 60 and 61 are similar but opposite to each other, the mounting arrangement for one only thereof will be described in detail.

The belt feeler finger 60 (Fig. 2) is mounted with a tight press fit on the knurled upper end portion 62a of a pivot pin 62 (Fig. 2) which is inserted, for free pivotal movement, in a hole 63 which extends through the abutment 57. A friction reducing washer 64 is interposed between the finger 60 and the abutment 57.

A flat spiral spring 65 is mounted in a recess 67 in the lower end of the abutment 57, the radially inner end 65a of the spring being secured to the pivot pin 62. The radially outer end of the spring 65 is secured to a screw 68 in the abutment 57. A washer 69 is mounted on the pivot pin 62 to form a closure for the spring recess 67, and is held in position by a cotter key 72 which also retains the pivot pin 62 against axial displacement.

The spring 65 is mounted to exert a slight torsional stress on the finger 60 normally to swing it into contact with the stop lug 59 on its abutment 60. Since the fingers 60 and 61 are mounted to be swung by their springs in opposite directions toward their stops, when the belt C is moved laterally from its centered position shown in Fig. 3, toward the position shown in Fig. 4, regardless of which direction the belt is traveling, it will urge one of the fingers more tightly against its stop and will swing the other of said fingers outwardly toward its dotted line position shown in Fig. 6. This causes the stress of the laterally moving belt to be transmitted to the finger which is retained by its stop from outward swinging movement and thence to the C-frame 53. This swings the C-frame, together with the U-frame 20 and the rollers 31 and 32 to an acute restoring angle relative to the belt.

The connecting link D is rigid but adjustable in length. It comprises fittings 66a and 66b screwed onto the threaded ends of a rod 66. The end fittings 66a and 66b are pivotally connected one to each of the C-shaped feeler support brackets 53 of the units A and B. The link D thus swings the feeler support brackets, and the roller supporting U-frames to which they are rigidly connected, in unison when either bracket 53 is moved pivotally relative to its mounting bracket 10.

The aligning mechanism, consisting of the units A and B and the link D, preferably is mounted on the lower run of the belt C to be controlled near its point of initial contact with the idler or tail roller (not shown) of the belt so as to guide the belt in properly centered condition onto the tail roller. The aligner can however, be mounted at any suitable location on the belt where the presence of the aligning rollers 31 and 32 will not interfere with the articles or material to be conveyed by the belt.

The following is a brief description of the operation of the illustrated form of the invention.

The units A and B preferably are mounted directly opposite each other on opposite sides of the belt, and with the belt marginal edge portions 70 and 71 inserted in the gaps 23 in the ends of the U-frame 20. The upper rollers 31 are pressed by their springs 51 and 52 toward the lower rollers 32 to grip the belt therebetween. The units A and B are spaced apart, and the length of the link D is adjusted by screwing the end fittings 66a and 66b to adjusted position on the rod portion 66, so that when the belt is centered between the two units A and B, and the axes of the rollers 31 and 32 of the unit A are axially aligned with the rollers 31' and 32' of the unit B, the belt feeler fingers 60 and 61 and 60' and 61' of the two units A and B will just clear the edges of the belt C. In this position of the parts, illustrated in Fig. 3, the feeler fingers will be swung by their associated springs 65 into contact with their respective stop lugs 59.

With the aligning mechanism thus adjusted, the belt can be run in either direction at will and the device will function to assist in maintaining it in alignment, or to return it to aligned condition in the event it should wander therefrom.

Assuming that the belt is centered, and is running in the direction indicated by the larger arrows in Fig. 3, no stress is exerted on any of the four feeler fingers of the two units A and B. Also, with the parts in their normal positions shown in Fig. 3, the axes of both pairs of rollers 31 and 32 are perpendicular to the center line of the belt and merely roll thereon with the belt gripped therebetween. This straight ahead action of the rollers obviously tends to maintain the belt in its centered condition. Should the belt wander from such centered position, however, for example toward the right to the position shown in Fig. 4, pressure and friction would be exerted by the edge 70 of the belt against the belt feeler fingers 60 and 61 of the unit A on the right hand side of the belt C. The finger 61 of the unit A would be swung outwardly away from its stop lug 59 by such frictional contact against the torsion of its spring 65, toward its position shown in Fig. 4. The other finger 60, however, would be urged by the frictional engagement of the right hand belt edge 70 therewith, more tightly against its stop lug 59, which would hold it against pivotal displacement. The pressure of the belt edge 70 therefore forces the rigidly retained finger 60 outwardly toward its position shown in Fig. 4, and thereby swings the C-shaped feeler support bracket 53 and the roller supporting U-frame 20 connected thereto in a counterclockwise direction toward the position shown in Fig. 4.

The link D transmits the swinging movement of the feeler support bracket 53 to the opposite or left hand feeler support bracket 53' of the unit B, thereby swinging the latter bracket through an angular distance equal to the angular displacement of the bracket 53 of the unit A. This swings the feeler finger 60' of the unit B outwardly away from the belt C a distance equal to the lineal lateral displacement of the finger 61 of the unit A. This same swinging movement of the feeler support bracket 53' of the unit B causes the finger 61' thereof to follow the retreating belt edge 71 closely, but remaining out of contact therewith, since within the effective angles of displacement of the feeler support brackets 53 and 53' of the units A and B respectively in both rotative directions from their normal positions shown in Fig. 3, the fingers 60 and 61' and 61 and 60' opposite each other are displaced transversely of the belt through substantially equal distances. Thus, the following finger 61', on the opposite side of the belt from the finger 60 which causes the angular displacement of the feeler support C-frames, never actually contacts the edge of the belt during the later displacement of the belt toward the position of Fig. 4, but remains closely adjacent thereto to prevent a too rapid return movement of the belt in the opposite direction when the belt is being restored to its properly centered position.

When the U-frames 20 and 20' thus are swung to axially parallel, but angularly displaced position, as shown in Fig. 4, the rotation of the rollers on the belt gripped therebetween exerts a diagonal stress on the belt in the direction of the shorter arrows in Fig. 4, thereby urging the belt back toward its properly centered position shown in Fig. 3. As the diagonally acting force of the rollers returns the belt toward its centered position, it carries it way from the finger 60 of the unit A which had swung the feeler frames 53 and 53' to their angularly displaced positions shown in Fig. 4, and moves the left hand belt edge into pressing contact with the finger 61' of the unit B. Since this latter finger is retained by its lug 59' from counterclockwise rotative displacement about its pivot pin 62', this returning pressure of the belt swings the feeler support frame 53' of the unit B, and by means of the link D, the feeler frame 53 of the unit A back toward their normal positions shown in Fig. 3. This same action also obviously returns the rollers to their normal position shown in Fig. 3. The greater the angular displacement of the belt from its centered position, the greater will be the angular displacement of the rollers, and therefore, of the diagonally acting force of the rollers tending to return the belt to its normally centered position. Under normal operating conditions the belt remains substantially in its centered condition at all times, so that in observing a belt running with an aligner embodying the present invention installed thereon, only a very slight swinging action of the U-frames and rollers may be detected. This is due to the fact that each slight tendency for the belt to run out is detected by the displacement of the feeler fingers on the side of the belt toward which the belt is displaced, and the restoring action is accomplished by a resultant slight angular restoring movement of the rollers before a severe condition of misalignment can result.

While I have illustrated a preferred embodiment of my invention, it will be apparent that the device is capable of substantial physical change without departing from the invention. For example, the rollers may require the provision of a suitable frictional surface to engage and align smooth stainless steel belts which are rapidly being introduced into some industries. The provision of such rollers would be a matter of routine design. Other modifications will of course be apparent to those familiar with the art, and such modifications are contemplated as being within the scope of the following claims.

What I claim, therefore, and desire to protect by Letters Patent is as follows.

I claim:

1. A belt aligning unit for use on a belt run traveling selectively in either of two opposite directions, and comprising a pivoted roller support frame adapted to be mounted adjacent a run of a belt to be aligned, roller means mounted in said frame to grip a portion of the belt, and two pairs of oppositely displaceable means offset longitudinally of the belt in opposite directions from said rollers and responsive to lateral movement of the belt for controlling the angular position of the roller axes relative to the direction of belt run, one of said pairs being mounted at each side of the belt, and one means of each pair of said displaceable means being mounted for displacement by engagement with the belt traveling in one direction, and for operative engagement by the belt traveling in the opposite direction.

2. A belt aligner comprising a mounting bracket adapted to be mounted adjacent an edge of a belt to be aligned, a frame pivoted on said bracket and having a gap therein adapted to receive a run of the belt therein, a pair of rollers mounted in said frame to have rolling engagement with opposite faces of the belt to be aligned, spring pressed pawl means pivoted in laterally spaced relation to a marginal edge of the belt and extending toward said belt edge for normally positioning said frame to steer said rollers into straight rolling engagement with the belt, said pawl means being constructed and arranged for engagement by the belt edge upon a lateral displacement of the belt to steer said rollers into angularly offset rolling engagement with the belt, to urge the belt in a direction opposite to that of its lateral displacement.

3. An aligner for flat belts comprising a supporting bracket adapted for mounting alongside a belt, a U-frame pivoted on said bracket to swing about a pivotal axis perpendicular to the plane of the belt, a pair of rollers mounted in axially parallel relation in said U-frame to receive the belt therebetween, means mounted to bias the rollers into belt gripping relation with each other, a laterally extending guide support carried by said U-frame, and a guide member carried by said guide support in offset relation to the pivotal axis of said U-frame, said guide member being positioned for engagement by said belt on a predetermined lateral displacement of the belt to swing the frame to a position wherein the roller axes are disposed at an acute angle to the direction of belt movement, thereby to urge the belt oppositely to said direction of lateral displacement.

4. An aligner for flat belts comprising a support adapted for mounting adjacent a belt to be aligned, a frame pivoted on said support for pivotal movement about an axis at right angles to the plane of the belt adjacent thereto, a pair of rollers mounted on said frame with their axes parallel to each other and at right angles to the pivotal axis of said frame, said rollers being adapted to receive and frictionally to engage a marginal portion of the belt therebetween, a pair of belt edge feeler members carried by said frame in offset relation to the pivotal axis of support of said frame lengthwise of said belt, means resiliently urging said feeler members rotatably in opposite directions, stop means mounted to engage each feeler member to arrest its rotative movement in a predetermined position of rotative movement, said feeler members being positioned for engagement by a belt edge portion on a predetermined displacement thereof from a predetermined position of alignment to swing one of said feeler members counter to its rotative direction of resilient urging to free the belt for movement in said predetermined direction of displacement, the other of said feeler members being urged by its engagement with said belt edge portion against its stop to transmit the belt displacing movement to said frame, pivotally to move said frame and the rollers therein to exert a restoring force transversely of said belt in a direction opposed to said direction of belt displacement.

5. A belt aligning unit comprising a roller support adapted to be mounted adjacent a run of a belt to be aligned, roller means mounted in said support to have steerable rolling engagement with the belt to be aligned, a feeler support steerably connected to the roller means, and two pairs of oppositely displaceable feeler means mounted on said feeler support, one pair of said feeler means being positioned adjacent each edge of the belt for engagement by an edge portion thereof upon a predetermined lateral movement of the belt from a centered position thereof, one feeler means of each pair thereof being movable to displaced position by the belt when traveling in one direction to steer the roller to a belt restoring position, and the other of said feeler means of each pair thereof being similarly movable by the belt when traveling in the opposite direction to steer the roller in an opposite belt restoring direction.

6. A belt aligner for a belt traveling selectively in either of two opposite directions, said aligner comprising a roller mounted to have frictional rolling engagement with a belt to be aligned, said roller being mounted for swinging movement transversely of the belt, two pairs of guide elements adapted to be mounted with one pair thereof adjacent each marginal portion of a belt engaged by the roller, said guide elements of each pair thereof being separated longitudinally of the belt, each of said guide elements being mounted for selective displacement to inoperative position by engagement with an edge of the belt upon predetermined lateral movement of the belt with the belt traveling in each of two opposite directions, and means interconnecting the two pairs of said guide elements and said roller to swing the roller relative to the belt upon a predetermined movement of the guide means by a predetermined lateral movement of the belt, thereby to exert a restoring force on the belt in a direction opposite to that of its displacement.

7. A belt aligning unit adapted to be mounted adjacent a belt to be aligned, said unit comprising roller means mounted to grip the belt, two pairs of spring-held, oppositely displaceable feeler fingers, one pair thereof being pivotally mounted adjacent each edge of the belt and spring pressed toward the belt for engagement by the edge of the belt adjacent thereto on a predetermined lateral displacement of the belt, one finger of each pair thereof being displaceable from its spring-pressed position by the belt traveling in one direction, and the other finger of each pair thereof being similarly displaceable by the belt traveling in the opposite direction, said feeler fingers being offset from said rollers longitudinally of the belt in opposite directions, and means interconnecting said feeler fingers and the rollers, to swing the roller means with their axes at an acute angle to the direction of belt travel upon a lateral displacement of said feeler fingers by said belt, thereby to exert a restoring force on the belt in a direction opposite to its direction of lateral displacement, regardless of the longitudinal direction of belt travel.

References Cited in the file of this patent

UNITED STATES PATENTS

| | | |
|---|---|---|
| 992,568 | Loutensock | May 16, 1911 |
| 2,553,473 | Reimel | May 15, 1951 |

FOREIGN PATENTS

| | | |
|---|---|---|
| 552,697 | Great Britain | Apr. 20, 1943 |